Patented Dec. 26, 1939

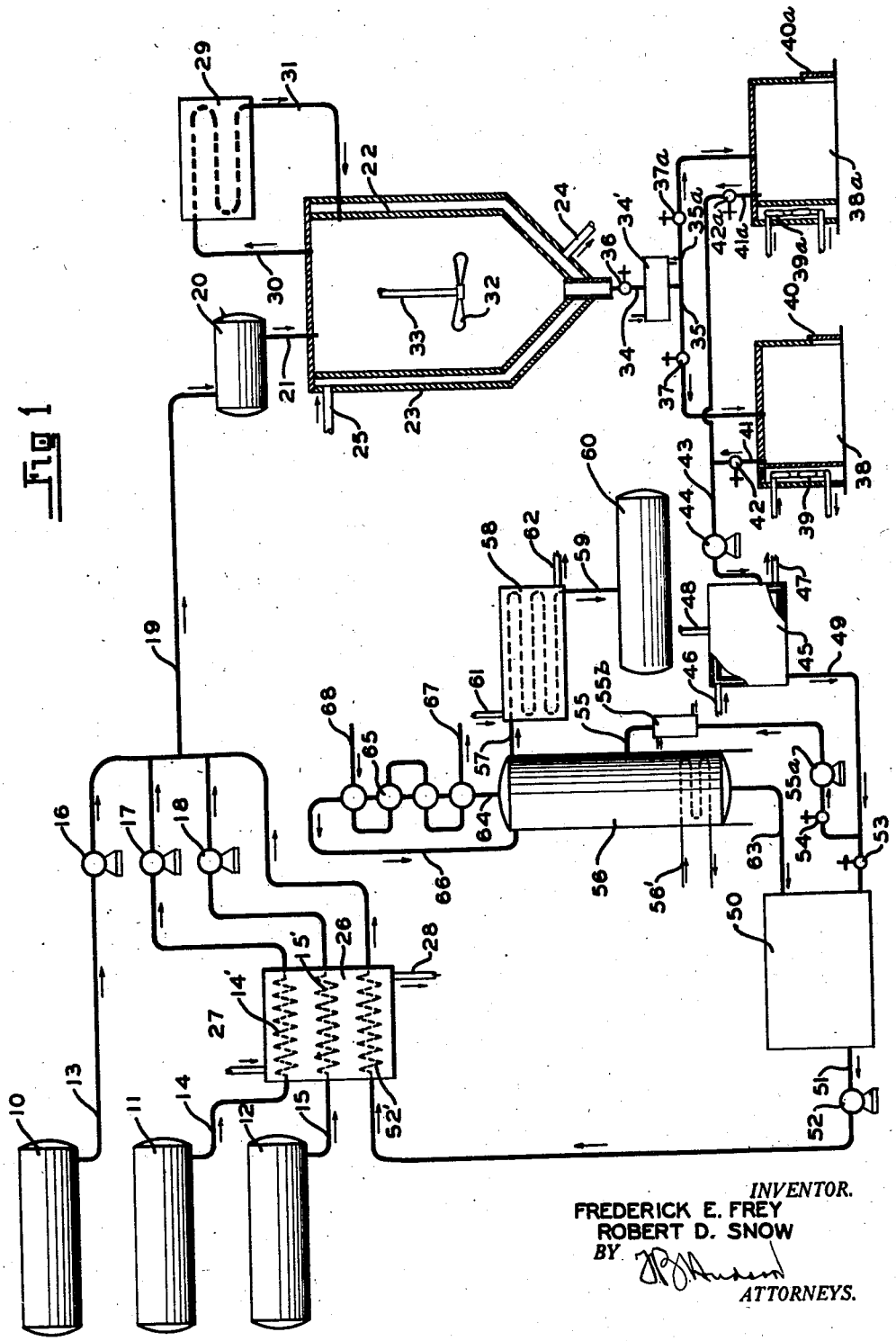

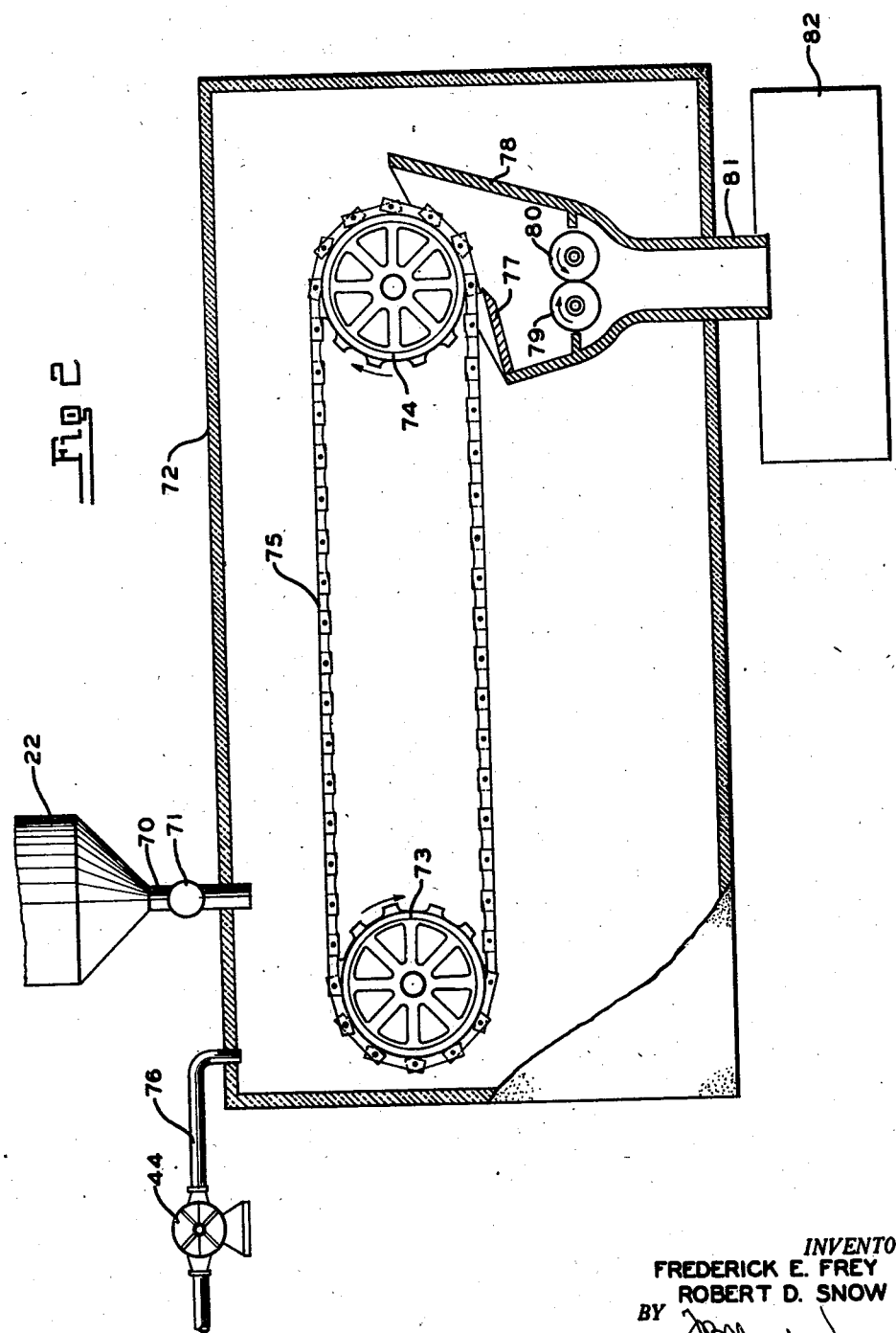

2,184,295

UNITED STATES PATENT OFFICE

2,184,295

METHOD FOR PRODUCING OLEFIN-SULPHUR DIOXIDE RESINS

Frederick E. Frey and Robert D. Snow, Bartlesville, Okla., assignors to Phillips Petroleum Company, Bartlesville, Okla., a corporation of Delaware Application January 31, 1936, Serial No. 61,813

12 Claims. (Cl. 260—94)

The present invention relates to the production of resins, and in particular to the production of olefin sulphur dioxide resins.

This invention has for its object the provision of an apparatus and method for continuously producing resins from olefins and sulphur dioxide.

Additional objects and advantages of this invention will become apparent from a consideration of the specification.

Prior art references to the reaction of sulphur dioxide and olefins invariably describe batch methods. The application of such batch methods to the production of olefin-sulphur dioxide resins on a large scale would require a large number of reactors, or reaction chambers, made sufficiently strong to withstand the pressures involved. If the resin is removed from these reactors in the solid form, it is practically necessary that the removable heads or openings be as large in diameter as the reactor. These factors necessitate expensive construction and high labor costs.

We have found that the olefin-sulphur dioxide resins which are soluble in liquid sulphur dioxide, for example those of the mono-olefins containing four or more carbon atoms per molecule and those of blends of propylene, and/or ethylene, with higher olefins in which the higher olefins predominate, can be converted to resins in a continuous manner. Application of the present invention to the production of resins on a large scale should result in reduced investment and labor costs as well as affording a means of making a more uniform product.

The idea of the present invention is to carry on the reaction of sulphur dioxide and an olefin body under such conditions of proportions of reactants, temperature, etc., that the resin formed separates as a second phase carrying with it sufficient sulphur dioxide in a dissolved or adsorbed state to form a fluid or plastic gel, removing this fluid or plastic resin phase from the reactor in a substantially continuous manner while charging the reactants and catalyst to the reactor in a substantially continuous manner.

This invention is based upon the solubility relationships between the resin and the reaction mixture of sulphur dioxide and olefin. Ethylene, propylene, isobutylene, isopropylethylene, and several of the conjugated diolefins form with sulphur-dioxide solid resins which have very little mutual solubility with liquid sulphur dioxide. Due to the obvious probability of choking or clogging the reactor, the present invention cannot be as readily and conveniently applied to the reaction of any of these aforementioned olefins in a pure form. This invention can, however, be applied to blends of these olefins with such olefins as butenes and pentenes in such proportions and at such temperatures that the resulting resin is soluble in liquid sulphur dioxide, or at least absorbs sufficient sulphur dioxide from the reaction mixture to convert it to a fluid or plastic gel. It can also be applied to butenes, pentenes, hexenes and several of the higher mono-olefins. The resins of butenes and higher olefins are quite soluble in liquid sulphur dioxide, the solubility of the resin generally increasing with increase in molecular weight of the olefin. The solubility of the resin in the reaction mixture of sulphur dioxide and olefins increases also, with the result that mixtures of hexenes or higher olefins with more than a moderate excess of sulphur dioxide will remain perfectly homogeneous throughout the reaction. In the case of such higher olefins the separation of the resin as a second fluid requires a smaller excess of sulphur dioxide. In the case of mixtures of butene-2 with not more than about 100 per cent excess of sulphur dioxide the resin is not very soluble in the reaction mixture and it tends to separate as a heavy viscous solution in sulphur dioxide. Because the butene resins are less soluble in liquid sulphur dioxide, a greater excess is required to obtain a fluid resin phase. By suitable control of the composition of the olefin-sulphur dioxide reaction mixture it is usually possible to obtain a separation of the resin solution as a second liquid phase. Paraffin hydrocarbons such as pentane or hexane may be added in limited quantities to facilitate the separation of the resin solution. In the process of this invention, the viscous resin solution is removed continuously while adding the reactants and catalysts continuously in the proper proportion and is preferably subjected to flash vaporization of most of the unreacted sulphur dioxide and other volatile material.

The apparatus and method for practicing the invention will be evident from the following description of the apparatus and method of operation, when considered in connection with the attached drawings, wherein, Fig. 1 illustrates diagrammatically, and partly in detail, one form of apparatus for realizing the present invention, and Fig. 2 illustrates a modified detail of the invention.

With reference now to Fig. 1, a catalyst, an olefin, and sulphur-dioxide are contained respectively in any convenient type of storage containers such as the ones shown at 10, 11 and 12. The desired amounts of the catalyst, olefin, and sulphur-dioxide are drawn respectively through the pipes 13, 14 and 15 by the pumps 16, 17 and 18 and into a common pipe 19, through which they flow to any suitable mixer 20. The mixer 20 may be of the centrifugal, jet, orifice, baffle, or any other type desired.

The mixture of the catalyst, olefin and sulphur-dioxide flows, or is forced from the mixer 20 through pipe 21 into the reactor zone, or reaction chamber 22 wherein the resin reaction of the said mixture takes place.

During the reaction of the olefin, and sulphur-dioxide, incident to the forming of the resin in the chamber 22, there is a small amount of heat generated by exothermic reaction which is usually not desirable. The temperature control in the chamber 22 may be effected in several ways. The reactor zone, or reaction chamber may be provided with internal cooling coils, or a jacket 23, as shown, may be provided, into which a cooling medium enters at 24 and after circulating therethrough leaves at 25.

Another means of controlling the temperature within the reactor zone 22 consists in removing sufficient sensible heat from the charge liquids, namely the catalyst olefin, and sulphur-dioxide, by passing them, or a part thereof, through a cooler 26 prior to mixing and introducing them into the reactor. The pipes 14 and 15 carrying the olefin and sulphur-dioxide are shown passing through the cooler 26 and serve as coils 14' and 15', and are cooled by a cooling medium flowing through the cooler entering by pipe 27 and leaving by way of pipe 28.

This method of cooling has the advantage of slowing down or preventing reaction during mixing and charging of the catalyst, olefin, and sulphur-dioxide.

The reactor chamber 22 may be cooled by any other suitable means or methods, which may include the provision of a condensor 29 into which the vaporous products from the reaction within the chamber 22 flow through pipe 30 and are condensed and cooled before flowing back through pipe 31 as reflux to cool the reactor.

It is frequently advantageous to agitate the charge undergoing reaction in the chamber 22, and to effect this an agitator 32 is shown mounted therein on a shaft 33 which may be supported and driven in any suitable manner.

As the viscous resin solution forms in the bottom of the reactor, it is removed substantially continuously through pipes 34, 35 and 35a which have interposed therein the respective control valves 36, 37 and 37a. The pipes 35 and 35a lead to expansion chambers 38 and 38a. The viscous resin solution may pass through a heater shown at 34' before entering the expansion chamber. It is preferable to flow the viscous resin solution into but one expansion chamber at a time, so by opening the valves 36 and 37 the resin solution flows from the reaction chamber 22 through pipes 34 and 35 into the expansion chamber 38 where most of the volatile materials are removed by flash vaporization and the resin is obtained in a very porous expanded form. The expansion chambers 38 and 38a are used alternately, one being filled with the viscous resin solution from the reaction chamber 22 while vapors and resin are being discharged and removed from the other. As many expansion chambers of the type shown at 38 and 38a as are needed or desired may be used, in accordance with the capacity of the reactor chamber 22. To facilitate the flash vaporization of the viscous resin entering the expansion chambers, or zones, heating means of any suitable type may be provided, and heating coils 39 and 39a are shown as one means of heating the chambers. Each chamber 38 and 38a is provided with a suitable means of removing the resin, and in the structure shown it takes the form of the doors 40 and 40a.

Vapors are exhausted from the resin and the expansion chambers 38 and 38a through the pipes 41 and 41a, which are controlled by the valves 42 and 42a, and which connect through pipe 43 with the vacuum pump 44. The vapors so withdrawn from the expansion chambers are cooled in the condenser 45 through which a cooling medium flows, entering at 46 and leaving at 47. From the condenser fixed gases are vented through the pipe 48 and bled out of the system, and therein the sulphur-dioxide and hydrocarbons are liquefied and passed by a pipe 49 to a storage tank or accumulator 50, and thence into pipe 51 through which they are forced by the pump 52 through the coil 52' of the cooler 26, for the purpose previously described, and then into pipe 19, mixer 20, and pipe 21 to the reactor chamber 22. If the condensate mixture recovered in the condenser 45 contains a non-reactive hydrocarbon, such as butane or pentane, it may build up in concentration in the reactor chamber 22 and the expansion chambers 38 and 38a and slow down the reaction. To compensate for such conditions a valve 53 is interposed in pipe 49 leading to the accumulator 50, and by closing it and opening the valve 54 in pipe 55 communicating with pipe 49 between the condenser 45 and valve 53, the condensate may be fed to a fractionating column 56 from which an azeotropic mixture of hydrocarbon and sulphur-dioxide is distilled overhead through the pipe 57 into the condenser 58, and through pipe 59 to the storage tank or accumulator 60. The fractionating column may be provided with any suitable heating means such as the steam coil shown at 56' and there may be interposed in pipe 55 any type of suitable pump 55a and preheater 55b which is shown diagrammatically in the drawing. Through the condenser 58 there is circulated any suitable cooling medium which enters through pipe 61 and leaves through pipe 62. From the fractionating column 56 sulphur-dioxide is drawn off at the bottom through pipe 63 as a kettle bottom product and introduced into the accumulator 50 from whence it flows through pipe 51 and ultimately reaches the reactor chamber 22.

The fractionating column is subjected to a reflux condensate, and to effect this vapors are led off from the top of the column through pipe 64 and after passing through the reflux condenser illustrated diagrammatically at 65 then flow through pipe 66 into the top of the column 56. Any suitable means for cooling the reflux condenser may be employed, and in the drawing it is illustrated as being cooled by a cooling medium which enters through pipe 68 and leaves by way of pipe 67.

By employing the above described apparatus and method, resins derived from olefins and sulphur dioxide may be produced in a continuous uninterrupted manner.

In Fig. 2 there is illustrated a modified structure and method of receiving and treating the viscous resin solution as it is removed from the reactor zone, or reaction chamber 22 through the pipe 70 controlled by the valve 71. The pipe 70 extends through the top wall of and into a housing 72 which is a heat vaporization chamber or zone, and which takes the place of the several expansion chambers 38 and 38a described in connection with Fig. 1. Within the chamber 72 there are mounted a pair of pulleys 73 and 74 which are driven by any suitable means and upon which there is carried an endless conveyor belt 75 upon which is continuously deposited the viscuous resin solution from the reactor chamber 22. The viscous resin expands while in the chamber 72 due to the heat therein and to the removal therefrom of the vapors through pipe 76 drawn from the chamber by the vacuum pump 44. The vapors are then treated and the condensate is recycled and utilized as described in connection with the invention as illustrated in Fig. 1. As the viscous resin solution is carried through the expansion chamber by the conveyor 75 it expands and becomes a porous resin, and as it reaches the end of the conveyor it is scraped from the belt 75 by a doctor blade, or similar scraping tool 77 in such a manner that it falls into a hopper 78 in which are mounted suitable disintegrating or pulverizing rollers 79 and 80 which reduce the porous expanded resin to any desired form. The resin then falls into and through the chute 81 and is collected in any suitable container such as the one illustrated at 82.

Thus it will be appreciated that this invention relates to a method of producing resins derived from olefins and sulphur-dioxide wherein the resins are of an expanded porous nature, and that the above description of this invention clearly describes the method of producing such resins and the apparatus for executing the method.

Having described our invention, what we claim is:

1. The continuous process of producing heteropolymeric resin products of the reaction of sulphur dioxide with an olefinic body which forms a resin product soluble in liquid sulphur dioxide, which comprises charging to a reaction zone the said olefinic body and sulphur dioxide in liquid phase continuously in such proportions, together with a catalyst for promoting the reaction, that a solution of resin product will separate from the reactants, withdrawing the said solution of resin product continuously from the reaction zone and vaporizing volatile materials from the solution of resin product.

2. A continuous process for the manufacture of olefin sulphur dioxide resins of the type which are soluble in liquid sulphur dioxide which comprises continuously feeding a mixture of hydrocarbon gases containing olefins which react with sulphur dioxide to form sulphur dioxide soluble resins, an excess of sulphur dioxide, and a catalyst for effecting the reaction, to a reaction zone under sufficient pressure to maintain at least a substantial portion of said olefins and sulphur dioxide in liquid phase, said olefins and sulphur dioxide being in such proportions that a solution of resin product will separate from the reactants, substantially continuously withdrawing said solution of resin product to a zone of low pressure sufficient to remove said excess sulphur dioxide and unreacted constituents of said hydrocarbon mixture from the solution, separating the excess sulphur dioxide from the unreacted hydrocarbons and recycling at least a portion of said sulphur dioxide to said reaction zone.

3. A process for continuously producing resins formed by the reaction of olefinic bodies and sulphur dioxide, which comprises continuously feeding an olefinic body of the type which reacts with sulphur dioxide to form a resin soluble in sulphur dioxide, an excess of sulphur dioxide over that required for reaction, and a catalyst for the reaction to a reaction zone under sufficient pressure that a liquid phase of olefinic body and sulphur dioxide exists and reaction takes place, controlling the proportions of the reactants such that a second liquid phase is formed containing said resins in solution in the excess sulphur dioxide, continuously withdrawing said solution to a heated zone of low pressure to remove part of the vaporizable constituents of the solution, withdrawing and condensing the condensable constituents of said mixture to separate any fixed gases therefrom, and recycling said condensable constituents to the reaction zone.

4. A process for continuously producing resins formed by the reaction of olefinic bodies and sulphur dioxide in the liquid phase, which comprises substantially continuously feeding a hydrocarbon mixture containing olefinic bodies which react with sulphur dioxide to form resins soluble in sulphur dioxide, an excess of sulphur dioxide over that required for the reaction, and a catalyst for the reaction to a reaction zone maintained under sufficient pressure that a liquid phase containing olefinic bodies and sulphur dioxide exists in the reaction zone and reaction takes place, controlling the proportions of the reactants such that a second liquid phase is formed containing said resin in solution in said excess of sulphur dioxide, substantially continuously withdrawing said solution to a zone of low pressure wherein most of the volatile constituents of said solution are removed therefrom and said resin is produced in solid form, separating any fixed gases from the volatile constituents and condensing the remainder thereof, and separating any non-reactive constituents from the liquefied sulphur dioxide.

5. The process of producing olefin-sulphur dioxide resins, which comprises continuously charging to a reaction chamber under a superatmospheric pressure a liquid mixture comprising an olefinic body which reacts with sulphur dioxide to form a resinous material soluble in liquid sulphur dioxide, sulphur dioxide in an amount substantially in excess of an equimolar equivalent of said olefinic body, and a suitable catalyst, controlling the proportions of the reactants such that a solution of resin product will separate from the reactants, removing from said reaction chamber the heat developed therein by reaction between said olefinic body and sulphur dioxide, whereby a substantially constant temperature is maintained in said reaction chamber, withdrawing from the bottom portion of said reaction chamber said solution containing the resin produced in said chamber and rapidly vaporizing volatile materials from said solution, whereby said resin is continuously obtained in a porous solid form.

6. In a process for producing a resinous material soluble in sulphur dioxide, the steps which comprise continuously passing under a superatmospheric pressure a liquid mixture comprising a volatile olefin hydrocarbon which forms with sulphur dioxide a resinous product soluble in liquid sulphur dioxide, sulphur dioxide in an amount substantially in excess of the equimolar quantity of olefinic material in said mixture and a suitable catalyst to a reaction chamber, which contains a vapor zone and a liquid zone wherein reaction takes place, controlling the proportion of the reactants to form a resinous product which collects in the bottom portion of said liquid zone as a separate viscous liquid phase containing uncombined sulphur dioxide, continuously removing a controlled portion of the constituents of said vapor zone, cooling and condensing said constituents and returning them substantially as a liquid to said reaction chamber, and continuously removing a portion of said viscous liquid phase and recovering resinous reaction products therefrom.

7. In a process in which an olefinic body reacts in the presence of a catalyst with approximately an equimolar quantity of sulphur dioxide to form a resinous product soluble in liquid sulphur dioxide, the steps which comprise continuously feeding a liquid mixture containing as reactants such an olefinic body and sulphur dioxide, said sulphur dioxide being present in excess of that required as a reactant, and a suitable catalyst to a reaction chamber under sufficient pressure to maintain at least a major portion of said reactants in a liquid phase in said reaction chamber, whereby reaction takes place, controlling the proportion of the reactants to form a resinous product which separates in the lower portion of said reaction chamber as a viscous second liquid phase containing uncombined sulphur dioxide, removing from said reaction chamber heat developed therein, withdrawing substantially continuously from the bottom portion of said reaction chamber said viscous liquid and recovering said resinous product therefrom.

8. In a process in which an olefinic body reacts with approximately an equimolar quantity of sulphur dioxide to form a resinous product soluble in liquid sulphur dioxide, the steps which comprise continuously feeding a liquid mixture containing as reactants such an olefinic body and sulphur dioxide, said sulphur dioxide being present in excess of that amount required as a reactant, to a reaction chamber under sufficient pressure to maintain at least a major portion of said reactants in a liquid phase in said reaction chamber, promoting a reaction between said olefinic body and said sulphur dioxide controlling the proportion of the reactants such that a resinous product is formed which separates in the lower portion of said reaction chamber as a viscous second liquid phase containing uncombined sulphur dioxide, removing from said reaction chamber heat developed therein, withdrawing substantially continuously from the bottom portion of said reaction chamber said viscous liquid and recovering said resinous product therefrom.

9. A continuous process for producing heteropolymeric resin products of the reaction of sulphur dioxide with an olefinic material which forms such a resin product soluble in liquid sulphur dioxide, which comprises substantially continuously charging to a reaction zone such an olefinic material and sulphur dioxide, together with a catalyst for promoting the reaction, maintaining a reaction temperature and a superatmospheric pressure such that said reactants are present together in a first liquid phase, charging said reactants in such proportions that a solution comprising resin products separates from said reactants as a second liquid phase, and substantially continuously withdrawing a material comprising said second liquid phase from said reaction zone.

10. The process of claim 9 wherein the olefinic material comprises a normal butene.

11. The process of claim 9 wherein the olefinic material comprises a normal pentene.

12. The process of claim 9 wherein the olefinic material comprises a normal hexene.

FREDERICK E. FREY.
ROBERT D. SNOW.